Feb. 13, 1962  M. L. FORMAN  3,021,112
WEDGING TOOL
Filed Nov. 9, 1959
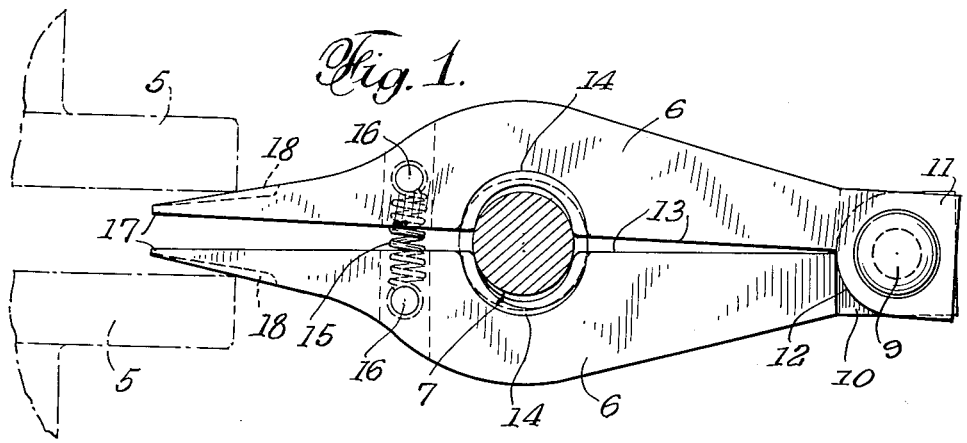
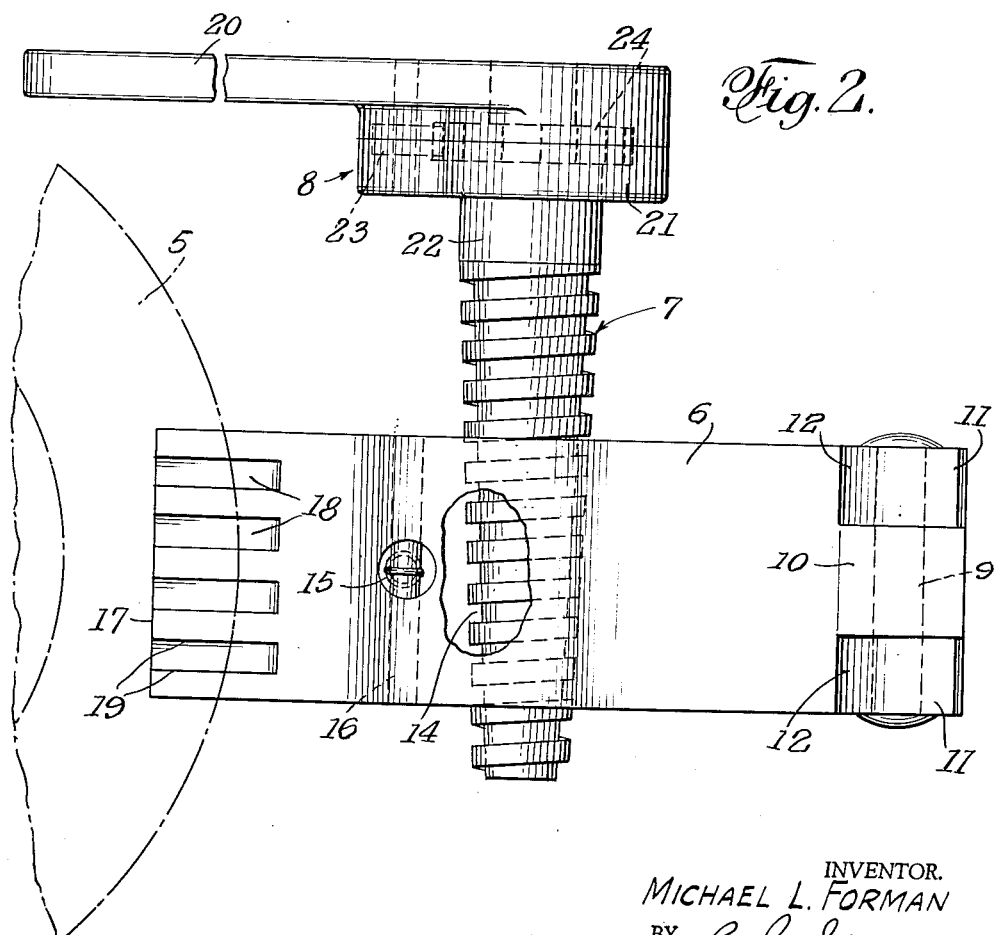
INVENTOR.
MICHAEL L. FORMAN
BY C. F. Stratton
ATTORNEY

United States Patent Office 3,021,112
Patented Feb. 13, 1962

3,021,112
WEDGING TOOL
Michael L. Forman, 700 W. Bennett St., Compton, Calif.
Filed Nov. 9, 1959, Ser. No. 851,612
4 Claims. (Cl. 254—100)

This invention relates to a wedging tool and deals with a tool that may have a wide variety of uses for wedging members apart and is especially adapted for wedging apart the flanges of connected pipes of a pipeline.

Even after the securing bolts connecting the flanges of two pipes have been removed, for various reasons, of which corrosion is one, the flanges are difficult to pry apart when separation of two pipes is desired. The resulting freezing together of the flanges creates a condition that is readily overcome by the present tool and it is, therefore, an object of the invention to provide a tool for this purpose that embodies considerable power advantage, so that simple manual manipulation of the tool will pry apart the flanges of two connecting pipes.

Another object of the invention is to provide a tool of the character above indicated that applies its powerful wedging force by an easy manual rotational operation.

A further object of the invention is to provide a wedging tool that retains its operative position during a flange-wedging operation.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, one embodiment of the present invention, which is given by way of illustration or example only.

In the drawing, like reference characters designate similar parts in the several views.

FIG. 1 is a plan view, with the operating portion removed, of a wedging tool according to the present invention.

FIG. 2 is a side elevational view thereof.

The drawing shows the flanges 5 of two connecting pipes. While the same are shown separated as when wedged apart by the present tool, it will be clear that these flanges were in abutting engagement before the same had been separated.

The present tool comprises, generally, hingedly-connected wedge members 6, a screw 7 for spreading said members, and means 8 to rotate said screw, preferably in an intermittent manner.

The wedge members 6 are connected, at one end by a hinge pin 9, one member having a hinge lug 10, and the other having hinge lugs 11 between which the lug 10 is disposed. Each said lug is formed to have a clearance face 12 that allows the wedge members to move apart on the pin 9 from a normally contracted position with the faces 13 of said members in flatwise contact.

Said members 6 are formed as arms, intermediate the ends of which is provided a screw seat 14, half of which is provided in each arm. Said seat, with the arms contracted, has the tapered form shown in FIG. 2. In the present case, the threads of said seat are preferably acme or square threads, or are formed in other usual ways to be strong against fracture when the wedging action of the tool meets unduly high resistance.

A spring 15 is provided for normally biasing the jaw members together, the same being here shown as a coil spring connected between pins or dowels 16 driven into the members from one side thereof and on which end eyes of the spring are connected.

The free ends 17 of the members 6 are thinned down to form sharp prying ends that when the members are contracted together, are capable of being driven between flanges 5 to achieve a partial entry of said ends into the seam between the pipe flanges. A maul or other heavy tool may be used to tap on the end of the connected arms that has the hinge pin 9 to achieve such driving of the ends 17 between the pipe flanges.

To insure that the wedges 6 will enter between the pipe flanges along a radial line and, particularly to obviate the same from tilting or tipping out of such a radial line position, the outer faces of the member 6 adjacent the edges 17 may be roughened or, as shown, be provided with longitudinal grooves 18 that are defined by longitudinal edges 19 which bite into or score the mating faces of pipe flanges 5 and thereby hold the tool from accidently swinging out of the normal straight line application that is desired.

The screw 7 is formed on the same taper as the screw seat 14 and has the same type of thread. The same has a length substantially greater than the length of said screw seat. The lower end of said screw 7 conforms in diametral size to that of the seat 14. Thus the screw is adapted to fit seat 14 with the wedge members 6 contracted by the spring 15. It will be clear that rotation oft he screw in a direction to feed the small end of the same outwardly of the seat 14 will cause the members 6 to be spread apart because progressively larger portions of the screw are being fed between said members. Thus rotation of the screw 7 on its own axis causes wedging movement on rotation of the members 6 around the axis of hinge pin 9 offset from the screw. Such screw wedging provides a considerable power advantage which is enhanced by use of the means 8.

Said means 8 comprises an operating handle or lever 20 extending from a housing 21 that is in rotational engagement with the large end 22 of the screw 7, a driving pawl or dog 23 carried by said housing, and a ratchet wheel 24 affixed to the end 22 of said screw and engaged by said pawl. It will be clear that the pawl is so arranged with respect to the teeth of wheel 24 that clockwise rotation of the housing 21 by means of the handle 20 will cause feed of the screw 7 and wedging apart of the members 6, accordingly. Recovery movement of the handle allows the pawl to slip or click over the ratchet teeth. Thus, the feed is an intermittent one, the means 8 allowing oscillatory movement of the handle so that the same may be operated in cramped quarters without interference by flanges 5 or other parts that may be in the path of a full rotational movement of the handle.

After the flanges have been wedged apart in the manner above indicated, the tool will either become loosened from its engagement with flanges 5 or the same may be tapped out of such engagement for re-use in connection with other difficult-to-separate pipe flanges.

While the foregoing specification illustrates and describes what I now contemplate to be the best mode of carrying out my invention, the construction is, of course, subject to modification without departing from the spirit and scope of my invention. Therefore, I do not desire to restrict the invention to the particular form of construction illustrated and described, but desire to cover all modifications that may fall within the scope of the appended claims.

Having thus described my invention, what I claim and desire to secure by Letters Patent is:

1. A wedging tool comprising two hinge-connected wedge members having thin, tapered edges opposite their connection, a tapered screw seat, half in one member and half in the other, and extending along the seam between the members, and a tapered screw in said seat arranged parallel with the longitudinal axis of the hinge connection, said screw having an end larger diametrally than the large end of the seat, and spreading the thin edges of said wedge members apart when rotated to feed said large end into the seat.

2. A wedging tool according to claim 1 in which the outer faces of the tapered edges are provided with scoring means longitudinal of the wedge members to bite into elements being wedged apart by the tool.

3. A wedging tool comprising two hinge-connected wedge members having thin, tapered edges opposite their connection, a tapered threaded screw seat, half in one member and half in the other, and extending along the seam between the members, said wedge members having inner faces that meet along the parting seam, resilient means biasing said members together, and a tapered screw in said seat arranged parallel with the longitudinal axis of the hinge connection, said screw having an end larger diametrally than the large end of the seat, and spreading the thin edges of said wedge members apart when rotated to feed said large end into the seat.

4. A separating tool comprising two separable members having a hinge connection at one end of said members, said hinge being flat on the outer edge to provide a face to drive the wedging tool into position, and the members having thin edges opposite their said connection, a tapered threaded screw seat, half in one member and half in the other, and extending along the seam between the members, and positioned between the hinge-connected end and the thin edges, and a tapered screw in said seat arranged with its longitudinal axis substantially parallel with the longitudinal axis of the hinge, said screw having an end larger diametrally than the large end of the seat when the members are closed, to spread apart the thin edges of said members when the screw is rotated to feed said large end into the seat.

References Cited in the file of this patent
UNITED STATES PATENTS

| | | |
|---|---|---|
| 153,009 | Nesbitt | July 14, 1874 |
| 2,657,904 | Evenson | Nov. 3, 1953 |
| 2,910,270 | Schultz | Oct. 27, 1959 |